(12) United States Patent
Persson et al.

(10) Patent No.: US 6,618,944 B1
(45) Date of Patent: Sep. 16, 2003

(54) LOAD-CARRYING VEHICLE ROOF AND METHOD FOR ITS MANUFACTURE

(75) Inventors: Arne Persson, Kyrkhult (SE); Åke Nylinder, Hovås (SE)

(73) Assignee: AB Volvo, Gothenburg (SE)

( * ) Notice: Subject to any disclaimer, the term of this patent is extended or adjusted under 35 U.S.C. 154(b) by 0 days.

(21) Appl. No.: 09/508,146

(22) PCT Filed: Sep. 16, 1998

(86) PCT No.: PCT/SE98/01657
§ 371 (c)(1),
(2), (4) Date: Mar. 7, 2000

(87) PCT Pub. No.: WO99/16657
PCT Pub. Date: Apr. 8, 1999

(30) Foreign Application Priority Data

Sep. 17, 1997 (SE) ............................................... 9703340

(51) Int. Cl.$^7$ .............................................. B21D 53/88
(52) U.S. Cl. ............................ 29/897; 29/458; 29/527.2
(58) Field of Search ............................... 29/897.2, 897.3, 29/897, 458, 460, 469, 527.1, 572.2; 156/212, 214; 264/45.4, 46.4, 46.6, 46.7; 428/77, 304.4; 296/214

(56) References Cited

U.S. PATENT DOCUMENTS

| 5,087,311 A | * | 2/1992 | Elliott et al. ................. 156/212 |
| 5,089,328 A | * | 2/1992 | Doerer et al. ................ 296/214 |
| 5,258,585 A | * | 11/1993 | Juriga ...................... 428/316.6 |
| 5,565,259 A | * | 10/1996 | Juriga ...................... 428/304.4 |
| 5,582,906 A | * | 12/1996 | Romesberg et al. ...... 428/308.4 |
| 5,709,925 A | * | 1/1998 | Spengler et al. ............. 428/198 |
| 5,863,370 A | * | 1/1999 | Munro ........................ 156/214 |
| 5,868,890 A | * | 2/1999 | Fredrick ...................... 156/214 |

FOREIGN PATENT DOCUMENTS

| GB | 2115753 | 9/1983 |
| GB | 2211798 | 7/1989 |

* cited by examiner

Primary Examiner—Char T. Jordan
Assistant Examiner—T. Nguyen
(74) Attorney, Agent, or Firm—Samuels, Gauthier, & Stevens, LLP

(57) ABSTRACT

The invention relates to a load-bearing vehicle roof of so-called sandwich construction, wherein the material layer included in the vehicle roof comprises polymeric materials, laminate materials and/or metal layers. Furthermore, the invention relates to a method for manufacturing such a vehicle roof. The load-bearing vehicle roof according to the invention comprises an outer cover layer (1), a core (3) and an inner cover layer (4) which together form a load-bearing structure. The load-bearing vehicle roof according to the invention is characterized in that at least one insulating layer (5) and/or a decorative layer (6), intended to be visible from a passenger compartment within a motor vehicle, is/are provided inside the inner cover layer (4), and that the insulating and/or the decorative layers (6) are provided as layers of the load-bearing vehicle roof before mounting onto the motor vehicle. Accordingly, the load-bearing vehicle roof according to the invention comprises both the outer and inner roof before being mounted onto a vehicle body, for which reason no separate inner-roof has to be post-mounted. The invention has its main application within the field of ground-based motor vehicles, such as passenger cars of commercial vehicles.

11 Claims, 2 Drawing Sheets

LOAD-CARRYING VEHICLE ROOF AND METHOD FOR ITS MANUFACTURE

TECHNICAL FIELD

The present invention relates to a load-bearing vehicle roof of so-called sandwich construction, wherein the material layers included in the vehicle roof comprise polymeric material, laminate material and/or metal layers.

Furthermore, the invention relates to a method for manufacturing such a vehicle roof, wherein the method comprises laminating and/or compression moulding methods.

The material structure of the vehicle roof according to the invention comprises a core with high bearing resistance and low density, wherein the core on both sides is enclosed by layers with high strength. In this way, a rigid construction with high load-bearing capability and low weight, and good sound and heat insulating ability, is obtained. Furthermore, the vehicle roof according to the invention provides both the outer and inner roof before mounting onto a vehicle body takes place, for which reason no separate inner roof has to be post-mounted.

The present invention has its main application within the field of ground-based vehicles, such as passenger cars or commercial vehicles.

BACKGROUND OF THE INVENTION

In conventional manufacturing of vehicle roofs of automotive sheet metal, different metal working operations, such as pressing, rolling, bending and welding, are usually utilized. Such conventional vehicle roofs are provided in one or several separate steps with possible sound insulating layers and different decorative layers on the side of the vehicle roof which will be facing towards the passenger compartment. As a rule, this takes place at the end of an assembly line for motor vehicles.

Conventional sheet metal roofs constitute an integrated, load-bearing part of the body of a vehicle and, with the presently utilized constructions, provide a great contribution to the strength and stiffness of the body and relatively good protection in a possible accident where, for example, a motor vehicle rolls or ends up resting on its roof. Something which might be perceived as a disadvantage with conventional sheet metal-based vehicle roofs is their relatively high weight.

Detachable roofs of for example plastic material, so-called hard-top roofs, are previously known. Roofs of this type, however, do not contribute to the stiffness of the vehicle body to any great extent, for which reason the body or the chassis has to be provided with additional reinforcements in order to increase the stiffness and the load-bearing capability.

Furthermore, so-called folding tops, i.e. upwardly and downwardly foldable roofs of different reinforced textile and/or plastic materials for use in for example convertible cars, are also long since known. Neither do such roofs contribute significantly to the stiffness of the vehicle and provide only an insignificant load-bearing capability, for which reason additional reinforcements are necessary.

Furthermore, vehicle roofs of thermosetting plastic composites with a sandwich structure are previously known. Such previously known vehicle roofs require that a separate inner roof is mounted after the outer roof has been mounted on the body, in a similar way as when sheet metal-based roofs are concerned.

SUMMARY OF THE INVENTION

Accordingly, the first object of the present invention is to provide a load-bearing vehicle roof which, already before being mounted onto a motor vehicle, provides both the inner and outer roof, and which after having been mounted constitutes a load-bearing, integrated part of the body of the vehicle.

In accordance with claim 1, this object is achieved by means of the load-bearing vehicle roof according to the invention comprising an outer cover layer, a core and an inner cover layer, which together form a load-bearing structure, and that thereby at least one insulating layer and/or one decorative layer intended to be visible from a passenger compartment within a motor vehicle is/are provided inside the inner cover layer, and that the insulating and/or decorative layers is/are provided as layers of the load-bearing vehicle roof before mounting onto said motor vehicle.

A second object of the present invention is to provide a method for manufacturing a load-bearing vehicle roof of the above-described type.

In accordance with claim 12, this object is achieved by means of the method according to the invention comprising preforming an outer cover layer and joining the preformed outer cover layer to a preformed core and applying an inner cover layer thereon in order to thereafter create a load-bearing structure by means of a consolidation, and that thereafter at least one insulating layer and/or at least one decorative layer intended to be visible from a passenger compartment within a motor vehicle is/are attached to the inner cover layer after the consolidation, and that the insulating and/or decorative layers are fixed to the inner cover layer before the load-bearing vehicle roof is mounted onto a vehicle body of the motor vehicle.

BRIEF DESCRIPTION OF THE DRAWINGS

In the following, the invention will be described with reference to the attached drawings, wherein FIG. 1 schematically shows a cross-section of a portion of a load-bearing vehicle roof according to the invention, and FIG. 2 schematically illustrates a method for manufacturing a load-bearing vehicle roof according to the invention.

DETAILED DESCRIPTION OF PREFERRED EMBODIMENTS

Figure 1:
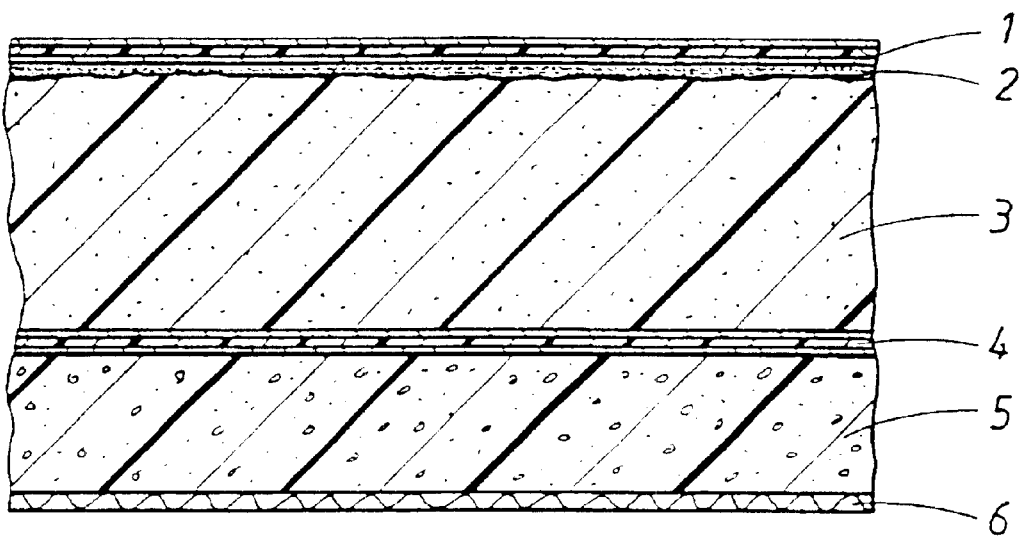

In FIG. 1, a schematic cross-section of the material structure of a load-bearing vehicle roof according to a first embodiment of the invention is shown.

From the top and downwards, i.e. from the outside and inwards when mounted onto a motor vehicle, the vehicle roof in the described, first embodiment comprises an outer cover layer 1, an adhesive layer 2, a core 3, an inner cover layer 4, an insulating layer 5 and a decorative layer 6.

On the side facing outwards (upwards in FIG. 1), the outer cover layer 1 provides a pleasant surface finish, because this layer will be facing towards the exterior of the motor vehicle and also has to be possible to paint or varnish with good results when this is necessary. In the described first embodiment, the outer cover layer 1 consists of a so-called laminate sheet with two thin layers of aluminium foil on each side of a thermoplastic polypropylene layer. The thickness of the two aluminium layers is approximately 0.2 mm, while the thickness of the polypropylene layer is about 0.8 mm.

In the described embodiment, the outer cover layer 1 is glued to a core 3 with the aid of an adhesive layer. In the described embodiment, the adhesive layer 2 consists of a hot-setting epoxy-glue of two-component type, wherein the glue application weight per square unit is approximately 100 g/m².

The core 3 has as its primary task to provide high bearing capacity and low weight per unit volume, i.e. low density. Furthermore, the core 3 contributes to the sound and heat-insulating capability of the vehicle roof according to the invention. In the described embodiment, the core 3 consists of a porous structural foam of polymetachrylimide (PMI). In the described embodiment, the thickness of the core 3 is approximately 10 mm.

On the inside of the core 3, there is situated an inner cover layer 4. The inner cover layer 4 has as its primary function to provide high strength. The inner cover layer 4 should, namely, together with the above-mentioned outer cover layer 1 and the core 3, provide a so-called sandwich structure with high stiffness and low weight in order to give the vehicle roof according to the invention the load-bearing properties required for the application. In the described embodiment, the inner cover layer 4 consists of a thermoplastic composite sheet of glass-fibre reinforced polypropylene, wherein the thickness of the thermoplastic composite sheet is about 0.6 mm. The inner cover layer 4 is attached to the core 3 with the aid of thermal bonds.

In the described embodiment, an insulating layer 5 of a soft polyester foam with a thickness of about 4.0 mm is attached to the inner cover layer 4. Also in this case, the cohesive force is thermal bonds.

Finally, a decorative layer 6 is attached to the insulating layer 5, also with the aid of thermal bonds. In the described embodiment, the decorative layer 6 consists of a knitted polyester material with an approximate thickness of about 0.4 mm.

In their function, the insulating 5 and the decorative layer 6 together can be said to correspond to a conventional vehicle inner roof. Thereby, the task of the insulating layer 5 is to provide heat and sound insulating ability and a certain softness to the inner roof, while the main function of the decorative layer 6 is to provide a decorative interior surface, intended to be visible from within the passenger compartment.

With reference to the attached FIG. 2, a preferred embodiment of a method for manufacturing a load-bearing vehicle roof according to the invention will be described.

In a first step so-called laminate sheet 1 is pressed into a shape which essentially corresponds to the shape of the outer roof which is to be moulded. This takes place in a heated pressing tool 7, 7' (indicated with dashed lines in FIG. 2), according to technique previously known per se. As mentioned above, the laminate sheet 1 consists of two thin aluminium layers on each side of a thermoplastic polypropylene layer. The laminate sheet layer 1, 1', 1" will constitute an outer cover layer in the material structure of the finished vehicle roof according to the invention.

When the preforming of the laminate sheet has taken place, a sheet-formed core material 3 is heated to about 195° C. in a heated-air oven 8 (indicated with dashed lines in FIG. 2), and is maintained at this temperature for approximately 10 minutes in order to obtain a complete heating of the entire core material 3. In the described embodiment, as mentioned above, the porous foam material utilized in the core material 3 is a structural foam of polymetachrylimide (PMI).

Thereafter, the preheated core material 3' is rapidly transported to a pressing tool 9, 9' (indicated with dashed lines), according to technique previously known per se, in order to be subjected to preforming with the pressing tool heated to about 120° C. for approximately 10 seconds. After the preforming, the preformed core 3" of structural foam is removed from the pressing tool 9, 9', wherein the shape of the preformed core 3" essentially corresponds to the shape of the vehicle roof according to the invention which is to be manufactured.

Thereafter, a hot-setting epoxy-glue is applied to the above-mentioned preformed laminate sheet 1', whereafter the preformed laminate sheet 1" with its adhesive layer 2 is placed into the above-mentioned pressing tool 9, 9' which was utilized for preforming the core 3". Thereby, the pressing tool 9, 9' is heated to approximately 118° C.

Thereafter, the preformed core 3" of structural foam is placed on top of the glue-coated laminate sheet 1" in the moulding tool 9, 9'.

Subsequently, a sheet 4 of glass-fibre reinforced polypropylene material heated to approximately 205° C., which is intended to constitute an inner cover layer in the material structure of the finished vehicle roof according to the invention, is placed on top of the preformed core 3".

The pressing tool 9, 9', mounted in a hydraulic press, is thereafter closed around the therein placed material batch with adhesive-coated laminate sheet 1", preformed core 3" and glass-fibre reinforced polypropylene material 4, after which the pressing tool is put under pressure for approximately 5 minutes. Thereby, the temperature of the tool members is approximately 118° C.

When the pressing tool 9, 9' has been opened, distance plates 10, 10' are placed between the tool members in order to achieve a play, which corresponds to a decorative layer 6 with a therewith integral insulating layer 5. Together, the decorative layer 6 and the insulating layer 5 are intended to function as an inner roof in the finished vehicle roof according to the invention. In the described embodiment, the decorative layer 6 is constituted of a knitted textile material comprising thermoplastic polyester fibres, whereas the insulating layer 5 is constituted of a soft polyeter foam with an open cellular structure.

The connected decorative 6 and insulating 5 layers are placed into the open moulding tool, on top of the layer of the material batch in the moulding tool which originates from the above-mentioned glass-fibre reinforced polypropylene sheet 4. Thereafter, the heated pressing tool is closed around the now complete material batch and remains closed for approximately 10 seconds. Finally, the pressing tool is opened and a load-bearing vehicle roof 11 according to the invention is removed from the pressing tool.

The ready-moulded vehicle roof 11 according to the invention comprises both outer and inner roof and is ready to be mounted onto a vehicle body after possible painting or varnishing of the exterior side of the outer cover layer.

In the following, a second particularly preferred embodiment of a method according to the invention will be described. Also in this case, when applicable, the description is made with reference to the appended FIG. 2.

In a first step, preforming of laminate sheet takes place in a corresponding way as in the first embodiment.

The preformed laminate sheet 1' is placed in a pressing tool 9, 9', the mould cavity of which in a closed condition has essentially the same dimensions as the vehicle roof according to the invention which is to be moulded.

Thereafter, an adhesive layer 2' is applied to the preformed sheet. This could take place in the same way as in the first embodiment, but is in the second embodiment done by means of placing a so-called adhesive film, for example of thermoplastic polyester, on top of the preformed sheet 1" in the pressing tool 9, 9'. In principle, the adhesive film 2' functions as a layer of hotmelt-glue, which melts when heated and after cooling adheres to surrounding layers by means of thermal bonds.

When the adhesive layer 2', i.e. the adhesive film, has been applied to the preformed sheet 1", a heated material batch consisting of heated core material 3" and heated fibre-reinforced thermoplastic material 4 is inserted in the pressing tool and placed on top of the adhesive film with underlying preformed sheet 1". Thereby, the heated core material 3" is placed in contact with the adhesive layer 2'.

Thereafter, the pressing tool 9, 9' is closed in order to consolidate the material batch 3", 4 and the preformed sheet 1" with the aid of the intermediate adhesive layer 2', i.e. the adhesive film. After the pressing tool has been closed for 15 seconds, it is opened and the layer with fibre-reinforced thermoplastic material 4' becomes visible.

An insulating layer 5 with a decorative layer 6 attached thereto and intended to face inwards towards the passenger compartment when the finished load-bearing roof according to the invention has been mounted onto a motor vehicle, are placed on top of the fibre-reinforced thermoplastic material 4'.

In the second embodiment, also the insulating foam material 5 is also provided with a second adhesive layer (not shown in FIG. 2), in the form of a thermoplastic adhesive film, in order to provide adhesion to the fibre-reinforced thermoplastic material 4' by means of thermal bonds.

When the connected insulating 5 and decorative 6 layers have been inserted, and suitable distance members 10, 10' have been mounted, the pressing tool 9, 9' is closed in order to consolidate the material layers enclosed therein. Thereby, the temperature of the pressing tool is 120° C., which causes the second adhesive layer (not shown) on the foam material of the insulating layer 5 to melt or at least soften sufficiently in order to enable consolidation to take place.

Figure 2:
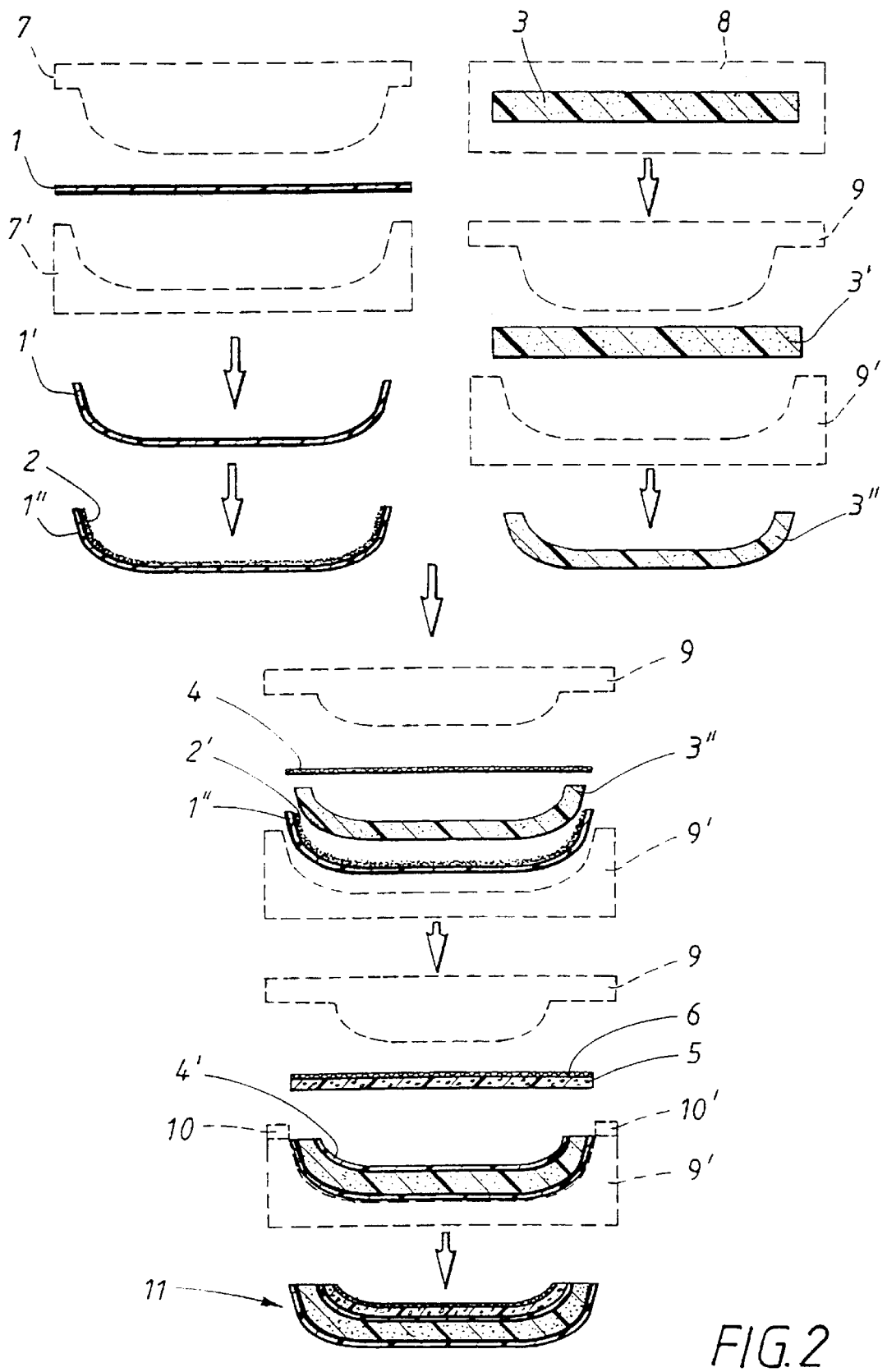

When the pressing tool has been opened, the moulded and still hot blank is removed in order to be placed in a so-called cooling tool (not shown in FIG. 2). The cooling tool has a mould cavity with the same shape as the pressing tool, but is provided with cooling means in its walls. After cooling to around room temperature, the cooling tool is opened (not shown) and a finished load-bearing roof 11 according to the invention can be removed.

In addition to the above-mentioned advantages provided by the vehicle roof according to the present invention, it can be mentioned that embodiments where the different layers of the vehicle roof are bonded to each other by means of thermal bonds, furthermore, facilitate possible recycling of the vehicle roof.

Unlike thermosetting glue joints, thermoplastic joints can namely be softened sufficiently by means of heating in order to enable the different layers included in the vehicle roof according to the invention to be separated from each other, whereafter the material in the respective layers can be recovered separately.

Furthermore, it should be mentioned that particularly preferred embodiments of the load-bearing vehicle roof according to the invention comprise the main portion of the reinforcement fibres included in the inner cover layer being oriented in the direction in which the stress direction of the expected loads on the vehicle roof are expected to arise. The reason for this is that such a fibre orientation provides maximum load-bearing capability.

The present invention is of course not limited to what has been described in connection with the preferred embodiments, or to what is shown in the attached drawings, but the scope of the invention is defined by the accompanying claims.

Accordingly, the above-mentioned laminate sheet in the outer cover layer could, for example, be replaced with a thin aluminium sheet, a thermoplastic layer, or a reinforced thermoplastic layer.

Depending on the selection of materials, the outer cover layer of the vehicle roof according to the invention can be provided with a surface finish, which enables the vehicle roof after being mounted to be painted together with the remaining body in a automotive paint shop, according to previously known techniques. However, it is also conceivable with embodiments where the outer cover layer provides a surface with a desired colour, which only requires a conventional polishing operation in order to obtain the final surface finish.

Instead of polymetachrylimide, the core material could consist of polyvinylchloride foam, polyimide foam or another suitable structural foam. It is also conceivable with embodiments of the invention where the core comprises another porous material with low density, for example balsa or cork.

The glass-fibre reinforced thermoplastic material which is utilized as an inner cover layer in the described embodiment could advantageously, for example, consist of a thermoplastic composite with continuous, oriented reinforcement filaments, or of a thermoplastic composite with a woven, braided or knitted reinforcement material. It is also conceivable with embodiments in which the inner cover layer comprises a metal layer, for example so-called expanded metal of aluminium.

Furthermore, the insulating layer also could consist of a polyethylene terephtalate foam, while the decorative layer could consist of, for example, a needle-punched nonwoven material of fibres suitable for the purpose.

It is conceivable with embodiments of the invention in which the insulating layer and the decorative layer are provided as two separate layers or materials, but also with embodiments where the function of the two layers is provided by a single, continuous material. In the latter case, such a combined insulating and decorative material could provide insulating properties in the layer or those layers which are inside the vehicle roof, while the visible surface or the surface layer of the combined material would provide decorative properties.

The load-bearing vehicle roof according to the invention is advantageously provided with mounting points of a type suitable for the purpose in a process step prior to mounting.

Thereby, the mounting points are intended to be joined to corresponding mounting points of a roofless vehicle body when mounting the vehicle roof. The mounting points can, for example, be constituted by reinforcements inserted into the composite material or protruding tongues for screw or bolt joints, or of surfaces which are specially prepared for gluing. Also different types of male/female couplings are conceivable.

What is claimed is:

1. A method for manufacturing a load-bearing vehicle roof, said vehicle roof comprising an outer cover layer, a core and an inner cover layer, wherein before mounting onto a body of a motor vehicle, at least one insulating layer and/or a decorative layer intended to be visible from a passenger compartment within said motor vehicle is/are provided inside the inner cover layer, wherein the method comprises the steps of:

to perform the outer cover layer in a first pressing tool;

to join said preformed outer cover layer to the core, preformed in a second pressing tool, and to apply the inner cover layer thereon;

to form a load-bearing structure, in the form of a sandwich structure with high stiffness and low weight, by means of a consolidation in said second pressing tool of said preformed outer cover layer and core together with said inner cover layer; and to apply and attach said insulating layer and/or decorative layer to said sandwich structure after said consolidation in order to provide said load-bearing vehicle roof.

2. A method for manufacturing a load-bearing vehicle roof according to claim 1, wherein the outer cover layer and the core, and the core and the inner cover layer, are attached to each other with the aid of heated thermoplastic material which after cooling creates thermal bonds.

3. A method for manufacturing a load-bearing vehicle roof according to claim 1, wherein the outer cover layer comprises laminate material with thermoplastic layer(s) and metal layer(s), and that said outer cover layer is heated to or above the softening temperature in order to, after molding and cooling, provide a preformed outer cover layer.

4. A method for manufacturing a load-bearing vehicle roof according to claim 1, wherein the outer cover layer comprises solid aluminum sheet metal, and that said outer cover layer is preformed in order to thereafter be fixed to the preformed core with the aid of an adhesive layer comprising a thermoplastic.

5. A method for manufacturing a load-bearing vehicle roof according to claim 1, wherein the core comprises a structural foam based on one or several polymers, preferably selected from the group polymetachrylimide, polyimide or polyvinylchloride.

6. A method for manufacturing a load-bearing vehicle roof according to claim 1, wherein the inner cover layer (4) comprises a reinforced thermoplastic, and that said inner cover layer (4) is brought into an adhesive state by means of heating before, or in connection with, the consolidation of the material layers included in the load-bearing vehicle roof.

7. A method for manufacturing a load-bearing vehicle roof according to claim 1, wherein the inner cover layer comprises reinforcement fibres, of which the main portion have been oriented in the direction in which expected loads on the load-bearing vehicle roof are expected to occur.

8. A method for manufacturing a load-bearing vehicle roof according to claim 7, the reinforcement fibres of the inner cover layer is provided in the form of a woven, knitted or braided textile material and/or that said reinforcement fibres comprises continuous filaments.

9. A method for manufacturing a load-bearing vehicle roof according to claim 1, wherein the inner cover layer utilized in the method comprises glass-fibres as reinforcement material.

10. A method for manufacturing a load-bearing vehicle roof according to claim 1, wherein the inner cover layer comprises expanded metal of aluminum which, with the aid of a thermoplastic material, is fixed to the core.

11. A method for manufacturing a load-bearing vehicle roof according to claim 1, wherein the insulating layer utilized in the method comprises polyester foam and/or that the decorative layer utilized in the method comprises a knitted polyester material.

* * * * *

UNITED STATES PATENT AND TRADEMARK OFFICE
CERTIFICATE OF CORRECTION

PATENT NO. : 6,618,944 B1  Page 1 of 1
DATED : September 16, 2003
INVENTOR(S) : Persson et al.

It is certified that error appears in the above-identified patent and that said Letters Patent is hereby corrected as shown below:

<u>Title page,</u>
Item [57], ABSTRACT,
Line 21, please change the following to read:
-- …, such as passenger cars or commercial vehicles. --

<u>Column 2,</u>
Lines 9 and 22, please change the following to read:
-- In accordance with the invention, this object… --

<u>Column 7,</u>
Line 1, please change the following to read:
-- …to preform the outer cover… --

<u>Column 8,</u>
Line 15, please change the following to read:
-- …roof according to claim 7, wherein the reinforcement fibres… --

Signed and Sealed this

Twenty-seventh Day of January, 2004

JON W. DUDAS
*Acting Director of the United States Patent and Trademark Office*